(12) United States Patent
Knoth et al.

(10) Patent No.: US 12,291,458 B2
(45) Date of Patent: May 6, 2025

(54) METHOD FOR REMOVING AN IMPURITY FROM A CHLOROSILANE MIXTURE

(71) Applicant: WACKER CHEMIE AG, Munich (DE)

(72) Inventors: Jens Felix Knoth, Marktl (DE); Sebastian Bochmann, Zschorlau OT Albernau (DE); Uwe Pätzold, Burghausen (DE); Sebastian Prost, Kirchdorf (DE)

(73) Assignee: WACKER CHEMIE AG, Munich (DE)

( * ) Notice: Subject to any disclaimer, the term of this patent is extended or adjusted under 35 U.S.C. 154(b) by 435 days.

(21) Appl. No.: 17/778,236

(22) PCT Filed: Nov. 27, 2019

(86) PCT No.: PCT/EP2019/082727
§ 371 (c)(1),
(2) Date: May 19, 2022

(87) PCT Pub. No.: WO2021/104618
PCT Pub. Date: Jun. 3, 2021

(65) Prior Publication Data
US 2022/0411273 A1    Dec. 29, 2022

(51) Int. Cl.
C01B 33/107 (2006.01)
B01J 20/28 (2006.01)
B01J 20/285 (2006.01)
C07F 7/12 (2006.01)
C07F 7/20 (2006.01)

(52) U.S. Cl.
CPC ....... *C01B 33/10794* (2013.01); *B01J 20/285* (2013.01); *C01B 33/1071* (2013.01); *C07F 7/12* (2013.01); *C07F 7/20* (2013.01); *B01J 20/28016* (2013.01); *B01J 20/28061* (2013.01); *B01J 20/28083* (2013.01)

(58) Field of Classification Search
CPC .......... C01B 33/10794; C01B 33/1071; C01B 33/08; B01J 20/285; B01J 20/28016; B01J 20/28061; B01J 20/28083; C07F 7/12; C07F 7/20
See application file for complete search history.

(56) References Cited

U.S. PATENT DOCUMENTS

| | | | |
|---|---|---|---|
| 3,126,248 A | 3/1964 | Pohl et al. | |
| 3,242,752 A | 3/1964 | Pohl et al. | |
| 3,252,752 A | 5/1966 | Arthur et al. | |
| 4,224,040 A * | 9/1980 | Gazzarrini | C01B 33/10784 95/133 |
| 4,374,110 A * | 2/1983 | Darnell | C01B 33/035 423/342 |
| 4,713,230 A | 12/1987 | Doornbos | |
| 5,723,644 A | 3/1998 | Tzou | |
| 5,855,790 A * | 1/1999 | Bradbury | G21F 9/12 428/394 |
| 2010/0278706 A1 | 11/2010 | Mueh et al. | |
| 2011/0052474 A1 | 3/2011 | Mueh et al. | |
| 2011/0150739 A1 | 6/2011 | Seliger et al. | |
| 2013/0168322 A1 | 7/2013 | Uyama et al. | |
| 2021/0060528 A1 | 3/2021 | Yaguchi et al. | |

FOREIGN PATENT DOCUMENTS

| | | |
|---|---|---|
| CA | 1162028 A | 2/1984 |
| DE | 1073460 B | 1/1960 |
| DE | 102008004396 A1 | 7/2009 |
| DE | 102008004397 A1 | 7/2009 |
| DE | 102011077455 A1 | 11/2011 |
| EP | 0105201 B1 | 11/1988 |
| JP | S5983925 A | 5/1984 |
| JP | H10316691 A | 12/1998 |
| JP | 2011524328 A | 9/2011 |
| JP | 2013001632 A | 1/2013 |
| TW | 201934196 A | 9/2019 |
| WO | 2012036034 A1 | 3/2012 |

OTHER PUBLICATIONS

Chen et al. Preparation of silica gel supported amidoxime adsorbents for selective adsorption of Hg(II) from aqueous solution. Chemical Engineering Journal 209 (2012) 235-244. (Year: 2012).*

* cited by examiner

*Primary Examiner* — Liam Royce
(74) *Attorney, Agent, or Firm* — BROOKS KUSHMAN P.C.

(57) ABSTRACT

Boron, phosphorus, arsenic, antimony and other impurities are at least partially removed from a mixture containing at least one chlorosilane and/or organochlorosilane by
a) contacting the liquid mixture with a carrier material functionalized with an amidoxime of the general structural formula (I),

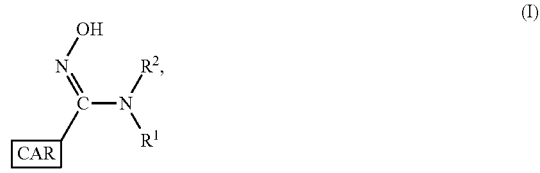

where
CAR=carrier material and $R^1$, $R^2$ are independently of one another H, alkyl, alkenyl, aryl, alkylaryl; and
b) optionally removing the functionalized carrier material.

20 Claims, No Drawings

METHOD FOR REMOVING AN IMPURITY FROM A CHLOROSILANE MIXTURE

CROSS REFERENCE TO RELATED APPLICATIONS

This application is the U.S. National Phase of PCT Appln. No. PCT/EP2019/082727 filed Nov. 27, 2019, the disclosure of which is incorporated in its entirety by reference herein.

BACKGROUND OF THE INVENTION

1. FIELD OF THE INVENTION

The invention relates to a method for at least partially removing an impurity from a mixture containing at least one chlorosilane and/or organochlorosilane and at least one impurity from the group comprising boron compounds, phosphorus compounds, arsenic compounds and antimony compounds.

2. DESCRIPTION OF THE RELATED ART

The production of halosilanes, especially chlorosilanes, may witness the appearance of impurities containing, for example, boron, arsenic, antimony or phosphorus. Halosilanes are the starting material for the production of polycrystalline silicon ("polysilicon"), for example by the Siemens process. In turn, polysilicon is, inter alia, the starting material for production of single-crystal silicon used in the semiconductor industry for the manufacture of electronic components (for example diodes, bipolar transistors and MOS transistors). Manufacture of these electronic components normally comprises a localized contamination of the single-crystal silicon with dopants (for example boron, arsenic) to achieve a targeted influencing of electrical conductivity. It is thus imperative that the polysilicon used as a starting material and the precursors thereof already have the lowest possible proportion of dopants.

Typical impurities are, for example, hydrogen and halogen compounds of boron, arsenic, antimony and phosphorus. These may generally be distillatively separated from the halosilanes only with difficulty. The impurities may then at least partially reappear in the silicon intermediate or end product (for example polysilicon, single-crystal silicon, silicones). Monitoring of the nature and amount of impurities is therefore necessary in the context of quality control. Polysilicon used for solar and semiconductor applications should ideally have a boron concentration of less than 20 ppta.

The production of chlorosilanes, in particular trichlorosilane (TCS) may be carried out by three processes based on the following reactions (cf. WO 2016/198264 A1):

  (1)

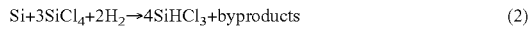  (2)

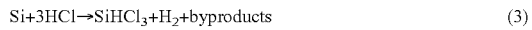  (3)

Byproducts that may be generated include further chlorosilanes, for example monochlorosilane ($H_3SiCl$), dichlorosilane (DCS, $H_2SiCl_2$), silicon tetrachloride (STC, $SiCl_4$) and also di- and oligosilanes. Constituents of the byproducts may further include impurities such as hydrocarbons, organochlorosilanes and metal chlorides in addition to the abovementioned impurities.

Especially the impurities introduced with the metallurgical silicon typically employed in processes (2) and (3) may be carried over into subsequent process steps. Especially important here in addition to carbon are classical dopants such as boron, phosphorus, arsenic and antimony. Contamination with boron-containing compounds can cause particular difficulties since boron is virtually no longer removable from silicon by zone melting in the course of the process on account of its distribution coefficient of 0.8. Different contents of impurities are found in the crude products of processes (1) to (3) depending on the quality of the employed raw materials and of the material of the reactor components and also the respective reaction conditions. It is customary to purify the crude products obtained by distillation. However, in some cases this purification can be particularly difficult and technically very complex due to the similar boiling points of the product and the impurity. For example, boron trichloride (boiling point: 12.4° C.) is distillatively removable from DCS (boiling point: 8.4° C.) only with considerable complexity.

The use of organochlorosilanes moreover demands a very high degree of purity, especially in the field of nanotechnology and microelectronics.

Production of organochlorosilanes, especially methylchlorosilanes, is especially carried out by the Müller-Rochow direct synthesis (cf. DE 10 2014 225 460 A1):

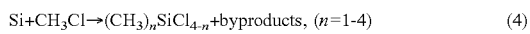  (4)

This comprises reacting an organic chlorohydrocarbon compound with metallurgical silicon with addition of copper catalysts and promoters to afford organochlorosilanes, especially methylchlorosilanes. Here too impurities may be introduced, especially via the metallurgical silicon.

Organochlorosilanes are employed for example in the semiconductor industry in the deposition of epitaxial layers. Even the smallest amounts of impurities, in particular those containing dopants such as boron, phosphorus, arsenic and antimony, cause considerable problems here. Generally, dopants can lead to undesirable doping effects and reduce the service life of electrical components through migration processes.

The distillation to obtain high-purity chlorosilanes and organochlorosilanes generally generates sidestreams containing the impurities. To remove the impurities the sidestreams are usually completely removed, thus leading to the loss of not inconsiderable amounts of valuable product. This may result in high costs (silicon losses, halogen losses, disposal costs). In addition, the sometimes multi-stage distillation requires a high energy input, usually in the form of steam.

Various approaches are therefore used to achieve effective removal of, in particular, dopant-containing impurities.

DE 10 2008 004 397 A1 describes the addition of triphenylmethyl chloride to a halosilane mixture to be purified in order to form poorly soluble complexes with boron and aluminum which may then be removed by mechanical means. According to DE 10 2008 004 396 A1, such poorly soluble complexes are removed by distillation. The use of complex-formers in principle generates sidestreams which contain not only the concentrated complexes to be removed but also products. These sidestreams require either complex workup or must be discarded.

CA 1162028 A discloses removing boron-containing impurities by adsorption onto a solid ion exchanger in the disproportionation of chlorosilanes. The ion exchanger contains tertiary or quaternary ammonium groups. It is disadvantageous that the disproportionation results in a chlorosilane mixture having an altered composition and requiring further resolution to isolate only one target product.

EP 0 105 201 discloses a process for removal of heavy metal ions of for example uranium, gallium and mercury from an aqueous solution using a chelate-forming amidoxime resin. A problem with the use of aqueous solutions is the hydrolysis sensitivity of halosilanes.

DE 1 073 460 describes purification of gaseous chlorosilanes, wherein said chlorosilanes are passed over an adsorbent. The adsorbent is laden with organic or inorganic substances which form stable addition compounds with gaseous boranes but do not undergo reaction with the chlorosilanes. Also described as suitable for the loading, inter alia, is dimethylglyoxime. The disadvantage here is that performance in the gas phase initially requires evaporation of the chlorosilanes generated in liquid form. However, the gas phase is required in order to avoid washing out the organic or inorganic substances from the adsorbent impregnated therewith since there is no chemical bonding present. Furthermore, the high volume of gas compared to liquid generally means that only markedly lower throughputs are achievable.

By contrast, U.S. Pat. No. 3,126,248 discloses carrying out the purification in the condensed phase, using the organic or inorganic substances proposed in DE 1 073 460. Here, the purified chlorosilane requires distillative separation from the substances washed out of the adsorbent. A further separation step is thus required.

The present invention has for its object to provide a particularly efficient and economic process for purifying halosilanes, wherein the disadvantages known from the prior art are avoided.

SUMMARY OF THE INVENTION

These objects are achieved by a process for at least partially removing an impurity from a liquid mixture containing at least one chlorosilane and/or organochlorosilane and at least one impurity from the group comprising boron compounds, phosphorus compounds, arsenic compounds and antimony compounds. The process comprises the steps of:
a) contacting the liquid mixture with a carrier material functionalized with an amidoxime of general structural formula (I),

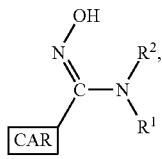

wherein
CAR=carrier material and $R^1$, $R^2$ are independently of one another H, alkyl, alkenyl, aryl, alkylaryl;
b) optionally removing the functionalized carrier material.

After the removing and/or contacting, the mixture has a reduced content of impurities.

DETAILED DESCRIPTION OF THE PREFERRED EMBODIMENTS

It has been found that the use of an amidoxime-functionalized carrier material makes it possible to achieve highly efficient separation of liquid chlorosilane and/or organochlorosilane compositions/mixtures from impurities of the recited types. While the chemical reaction between the amidoxime functionality and the impurity may in principle also be accompanied by a reaction between the chlorosilane/organochlorosilane and the amidoxime functionality, the amidoxime has such a high affinity for the impurities that this reaction is negligible. The activity of the functionalized carrier material is not limited. It is further particularly advantageous when no disproportionation of the chlorosilane/organochlorosilane takes place, thus avoiding the need for downstream separation of a resulting multicomponent mixture. Thus after a duration of 24 h normally less than 1% by weight, especially less than 0.5% by weight, of disproportionation products are formed. This figure is in fact generally less than 0.2% by weight.

The pressure and the temperature of the process are chosen such that the mixture is in the liquid state of matter. Process step a) is preferably carried out in a pressure range of 1 to 20 bar (gauge), more preferably 1.1 to 10 bar (gauge), and in particular 1.25 to 5 bar (gauge). The temperature is preferably −50° C. to 160° C., more preferably −30° C. to 100° C., and in particular −10° C. to 40° C.

According to formula (I) the amidoxime may be bonded directly to the carrier material (i.e. a functional group of the carrier material) with its carbon atom. This is especially a covalent bond. For example the amidoxime may be synthesized from a nitrile group of a polyacrylonitrile or polyacrylonitrile copolymer as the carrier material. However, a linker may also be provided between the carrier material and the amidoxime. The linker may be, for example, a methylene group, benzyl group or a linear hydrocarbon chain having 2 to 5 carbon atoms.

The alkyl radical for $R^1$ and/or $R^2$ may be linear, branched or cyclic. It may be a radical selected from the group comprising Me, Et, Pr, i-Pr, n-Bu, i-Bu, t-Bu, for example. The alkyl radical preferably comprises 1 to 16, more preferably 1 to 12, and in particular 1 to 6, carbon atoms.

It is preferable when $R^1$ and $R^2$ are independently of one another H or Me. It is particularly preferable when both radicals correspond to an H atom. It has surprisingly been found that an amine nitrogen ($R^1$, $R^2$=H) does not favor disproportionation of the chlorosilanes/organochlorosilanes as is the case for example for amino-functionalized ion exchangers.

The chlorosilane is preferably an acyclic chlorosilane of the general formula $H_xSi_nCl_{(2n+2-x)}$, wherein 0≤x≥12 and 1≤n≥5. Alternatively or in addition it may be a cyclic chlorosilane of general formula $H_xSi_nCl_{(2n-x)}$, wherein 0≤x≥20 and 4≤n≥10. The mixture may contain only one or else a plurality of these chlorosilanes.

The chlorosilane is especially selected from the group comprising STC, TCS, DCS and combinations thereof.

The organochlorosilane is preferably an acyclic organochlorosilane of the general formula $H_xSi_nR^3_yCl_{(2n+2-x-y)}$ where 0≤x≥11, 1≤n≥5 and 1≤y≥12. Alternatively, or in addition it may be a cyclic organochlorosilane of general formula $H_xSi_nR^3_yCl_{(2n-x-y)}$ where 0≤x≥19, 4≤n≥10 and 1≤y≥20, wherein $R^3$=alkyl, aryl, alkylaryl or alkoxy.

With regard to the alkyl radical, reference may be made to what is recited above. However, it is preferable when $R^3$ represents an Me, methoxy or ethoxy radical.

The process according to the invention is preferably performed under anhydrous or at least substantially anhydrous conditions. Substantially anhydrous conditions is to be understood as meaning that traces of water may be present in the functionalized or non-functionalized carrier material. These are typically less than 5% by weight. The mixture is generally anhydrous.

The functionalized carrier material may contain a proportion of water of less than 5% by weight, preferably less than 3% by weight, and more preferably less than 2% by weight. It is in principle immaterial to operation for the carrier material to comprise the recited traces of water. To avoid losses through chlorosilane/organochlorosilane hydrolysis the water content is normally kept as low as possible. Thus, in principle no moisture is additionally supplied. However, it is generally also not necessary to subject the carrier material to an additional drying step, since the recited water content is usually not exceeded for customary carrier materials.

The carrier material used as the carrier of the amidoxime functionalization may be selected from a polymer familiar to those skilled in the art for producing ion exchangers and adsorbers. It is preferably selected from the group comprising polyacrylonitrile, polyacrylic acid, polyacrylic acid ester, polymethacrylic acid, polymethacrylic acid ester, styrene-divinylbenzene copolymer and combinations and copolymers thereof. It is particularly preferably a styrene-divinylbenzene copolymer and/or acrylonitrile-divinylbenzene copolymer. It is in particular a copolymer of acrylonitrile-divinylbenzene copolymer and polymethacrylic ester. The solid may further be a silica.

The carrier material is especially a solid. A solid carrier material is thus preferably used, and may be in the form of particles and/or fibers, for example. The carrier material is more preferably in particulate form and preferably has a surface area of 10 to 2000 m$^2$/g, more preferably 25 to 1000 m$^2$/g, and in particular 50 to 500 m$^2$/g. The surface area may decrease in the functionalized state. Typical values here are 5 to 500 m$^2$/g. Surface area measurement may be carried out for example by BET measurement (DIN ISO 9277).

The carrier material may be in the form of particles having an average particle size (=average particle diameter) of 0.149 to 4.760 mm (4 to 100 mesh), preferably 0.177 to 2.0 mm (10 to 80 mesh), more preferably 0.400 to 1.410 mm (14 to 40 mesh), for example. The determination may be carried out by dynamic image analysis (ISO 13322-2), laser diffraction, or sieving.

The carrier material may further be macroporous. It may especially be in the form of macroporous particles. The carrier material preferably has an average pore diameter of 40 to 900*10$^{-10}$ m, more preferably of 50 to 800*10$^{-10}$ m, and most preferably of 75 to 700*10$^{-10}$ m. The average pore diameters usually remain in the recited size ranges even after the functionalization of the carrier material.

Independently of the functionalization of the carrier material the pore structure may optionally allow adsorption of the impurities at least to a small extent.

The functionalized carrier material may exhibit swelling behavior as a result of the contacting with the mixture. However, the volume increase (swelling) of a particulate carrier material is preferably ≤7%, more preferably ≤6%, and in particular ≤5%.

The functionalized carrier material in process step a) is preferably in the form of a fixed bed. The fixed bed is in particular continuously traversed by the mixture. This makes it possible to eschew separate removal of the functionalized carrier material.

In a preferred embodiment in step a) the functionalized carrier material is in the form of a fixed bed in one or more containers arranged in series or in parallel which are preferably continuously traversed by the mixture.

The hydrodynamic residence time τ of the mixture in a reaction volume filled with the functionalized carrier material (this may be one or more containers) is preferably 0.5 to 1800 s, more preferably 1.0 to 1200 s, and in particular 1.5 to 900 s. τ is calculated according to $$\tau = \frac{V_R}{\dot{V}},$$

wherein
$V_R$: Reaction volume: volume filled with functionalized carrier material [m$^3$],
$\dot{V}$: volume flow of the mixture [m$^3$/s].

The total reaction volume (in the case of several, for example serially arranged, containers the total reaction volume is the sum of the individual reaction or container volumes) is preferably 0.025 to 5 m$^3$, more preferably 0.05 to 3 m$^3$, and in particular 0.1 to 2 m$^3$.

The functionalized carrier material present as a fixed bed is preferably retained using a sieve or a perforated screen.

The mixture may in principle also remain in contact with the functionalized carrier material in the form of a fixed bed or a fluidized bed for a predetermined time before being removed. In the simplest case the removal may be effected by discharging the mixture from a container, wherein the solid, functionalized carrier material is retained by a sieve or a perforated screen.

The removal of the functionalized carrier material laden with the impurity in process step b) is preferably effected by solid-liquid separation, in particular by filtration.

The amidoxime-functionalized carrier material may be loaded with with 1 to 100 mg, more preferably 1.5 to 80 mg, and most preferably 2 to 60 mg, of impurity per gram of the functionalized carrier material.

It is preferable when the concentration of the impurity in the mixture is determined before step a) and/or after step a) or optionally after step b). This makes it possible to adapt the volume flow of the mixture in the case of continuous traversal of the functionalized carrier material as fixed bed, for example. It is further possible to switch over to an identical parallel adsorber sector as soon as the concentration of impurity after passage through the functionalized carrier material exceeds a target value. This maximizes uptimes. The concentration of the impurities may be determined by ICP-MS (mass spectrometry with inductively coupled plasma) and/or ICP-OES (optical emission spectrometry with inductively coupled plasma), wherein sampling is preferably carried out on a continuous basis. Another option for determining the concentration of the impurity in a chlorosilane mixture employed in the context of the Siemens process for example is measurement of the electrical resistance of the deposited silicon. The measurement of electrical resistance may be carried out according to the standard SEMI MF84. The dopants in the deposited silicon may also be determined by photoluminescence as described for example in DE 10 2011 077 455 A1.

In a preferred embodiment after a first contacting with the functionalized carrier material according to process step a) the mixture may be recycled to the as yet untreated mixture upstream of step a) in order to be re-contacted with the functionalized carrier material. It may accordingly be preferable to perform step a) two or more times.

The impurity is especially hydrogen, halogen, carbon and/or silicon compounds of boron, phosphorus, arsenic (for example AsCl$_3$) and/or antimony (for example SbCl$_3$, SbCl$_5$). The mixture may contain different compounds of one or more of the recited elements as the impurity. The impurity is preferably selected from compounds of boron and/or phosphorus (for example $PCl_3$, $PHCl_2$; $MePH_2$; $MeSiH_2PH_2$). It is particularly preferably selected from compounds of boron. It may especially be selected from boranes (for example $B_2H_6$) and/or haloboranes ($BCl_3$).

The at least one impurity is not in ionic form.

The mixture may contain a proportion of 5 ppta to 1000 ppma, preferably 10 ppta to 500 ppma, more preferably 50 ppta to 100 ppma, of the impurity (before process step a)).

If the mixture comprises a boron compound it preferably comprises after process step a) or optionally after process step b) a proportion of the boron compound as the impurity that has been reduced by 80%, more preferably by 90%, and especially by 99%. The boron depletion may also be more than 99%.

If the mixture comprises a phosphorus, arsenic or antimony compound it preferably comprises after process step a) or optionally after process step b) a proportion of the recited compound as the impurity that has been reduced by 70%, particularly preferably by 80%, especially by 85%. The depletion may also be more than 85%.

Chlorosilanes purified by the process according to the invention may be used for producing polysilicon, wherein the polysilicon in each case comprises less than $1000*10^{-12}$, preferably less than $100*10^{-12}$, more preferably less than $10*10^{-12}$, atom fractions of boron and arsenic. The atom fractions of phosphorus may be less than $1000*10^{-12}$, preferably less than $100*10^{-12}$, more preferably less than $20*10^{-12}$. The atom fractions of antimony may be less than $1000*10^{-12}$, preferably less than $100*10^{-12}$, more preferably less than $50*10^{-12}$. The resistance of the polysilicon is preferably more than 4000 Ohm*cm, more preferably more than 6000 Ohm*cm, and in particular more than 7000 Ohm*cm. An additional purification of the chlorosilanes (for example a distillation) after performance of the process according to the invention is in principle not necessary.

In a preferred embodiment steps a) and b) are incorporated into an integrated system for producing polysilicon. The integrated system preferably encompasses the following processes:

Production of a technical grade TCS-containing chlorosilane mixture (process (1) to (3)), purification of the produced chlorosilane mixture by the process according to the invention; deposition of polysilicon, preferably by the Siemens process or as granulate.

A further aspect of the invention relates to the use of the carrier material functionalized with an amidoxime of general structural formula (I) for removal of boron compounds, phosphorus compounds, arsenic compounds and/or antimony compounds from a mixture containing chlorosilanes and/or organochlorosilanes.

The functionalized carrier material preferably has a proportion of water of <5% by weight, preferably <3% by weight, more preferably <2% by weight. In terms of the further configuration of the amidoxime and of the carrier material, reference may be made to what is recited above.

EXAMPLES

Example 1: General Procedure

The adsorber material (inventively functionalized carrier material or comparative material) was arranged as a fixed bed in a container (cartridge) having a volume of 180 ml and a liquid chlorosilane mixture (TCS proportion: >99% by weight) was passed through it at 20° C. and 1 bar (g) at a volume flow of 1 kg/h ($7.46*10^{-4}$ m³/h based on the density of TCS (1.34 kg/l)). Accordingly, τ was about 870 seconds.

The mixture before and after contacting with the adsorber material was then deposited as polysilicon by the Siemens process and the dopant concentration of the polysilicon determined. Determination of the dopants was carried out according to SEMI MF 1398 on an FZ single-crystal produced from the deposited, polycrystalline material (zone melting process, SEMI MF 1723) by means of photoluminescence. This method of determination is described for example in DE 10 2011 077 455 A1. Or the dopant concentration of the main impurities was determined from the specific resistance of the sample according to SEMI MF 732 (cf. for example example 1b).

Example 1a

The adsorber material employed was a particulate acrylonitrile-divinylbenzene copolymer functionalized with an amidoxime of formula (I) ($R^1$=H, $R^2$=H), wherein the average particle size was 0.400 to 1.410 mm. The average pore diameter of the functionalized particles was $400*10^{-10}$ m. The measured dopant concentrations are reported in table 1.

TABLE 1

|  | Before contacting of the mixture with the adsorber material | After contacting of the mixture with the adsorber material |
| --- | --- | --- |
| Boron [ppta] | 7312.0 | 3.4 |
| Phosphorus [ppta] | 75.0 | 8.3 |
| Arsenic [ppta] | 16.0 | 2.2 |

Example 1b

In comparison with example 1a a liquid chlorosilane mixture having a higher impurity of boron was employed. The measured boron concentrations are reported in table 2.

TABLE 2

|  | Before contacting of the mixture with the adsorber material | After contacting of the mixture with the adsorber material |
| --- | --- | --- |
| Boron [ppta] | 108,000 | 74 |

Example 1c

The adsorber material employed was an acrylonitrile-divinylbenzene copolymer functionalized with an amidoxime of formula (I) ($R^1$=H, $R^2$=H) (cf. Example 1a) but, in a departure from the general experimental description, only 90 ml was used (τ about 435 s). The measured dopant concentrations are reported in table 3.

TABLE 3

|  | Before contacting of the mixture with the adsorber material | After contacting of the mixture with the adsorber material |
| --- | --- | --- |
| Boron [ppta] | 12,278.0 | 22.5 |
| Phosphorus [ppta] | 117.0 | 7.7 |
| Arsenic [ppta] | 19.0 | 1.7 |

Even with a reduction of the residence time τ to 435 s (180 ml to 90 ml volume of the functionalized carrier) there is no deterioration in removal of the dopants (retention: B: 99.8%; P: 93.4%; As: 91%).

Comparative Example 1d

The adsorber material employed was a silica adsorber (known from DE 25 46 957 A1) but, in a departure from the general experimental description, only 90 ml (τ about 435 s) was used. The liquid chlorosilane mixture corresponded to that of example 1a. The measured dopant concentrations are reported in table 4.

TABLE 4

|  | Before contacting of the mixture with the adsorber material | After contacting of the mixture with the adsorber material |
|---|---|---|
| Boron [ppta] | 14.7 | 5.2 |
| Phosphorus [ppta] | 12.3 | 18.2 |
| Arsenic [ppta] | 3.2 | 6.8 |

Removal of boron is markedly poorer. In the case of phosphorus and arsenic the silica adsorber actually causes contamination. The purities achievable with the carriers functionalized according to the invention thus cannot be achieved without an additional purification step (for example distillation).

Example 2: General Procedure

The adsorber material (inventively functionalized carrier material or comparative material) was arranged as a fixed bed in containers having different volumes and a liquid chlorosilane mixture (TCS proportion: >99% by weight) at 20° C. and 1 bar (g) with different volume flows flowed through it. The mixture before and after the contacting was then deposited as polysilicon by the Siemens process and the dopant concentration determined as described hereinabove.

Example 2a

The adsorber material employed was an acrylonitrile-divinylbenzene copolymer functionalized with an amidoxime of formula (I) ($R^1$=H, $R^2$=H) (cf. Example 1a). The volume of the container was 30 l. The volume flow was 12,500 kg/h, thus giving τ=12 s. The measured boron concentration is apparent from table 5.

TABLE 5

|  | Before contacting of the mixture with the adsorber material | After contacting of the mixture with the adsorber material |
|---|---|---|
| Boron [ppta] | 160.1 | 12.0 |

Example 2b

In comparison with example 2a a volume flow 2100 kg/h was employed, thus giving τ=70 s. The measured dopant concentrations are reported in table 6.

TABLE 6

|  | Before contacting of the mixture with the adsorber material | After contacting of the mixture with the adsorber material |
|---|---|---|
| Boron [ppta] | 69.4 | 10.6 |
| Phosphorus [ppta] | 36.0 | 7.5 |
| Antimony [ppta] | 12.9 | < 1 |

Comparative Example 2c

The adsorber material employed was a silica absorber (known from DE 25 46 957 A1). The volume of the container was 120 l. The volume flow was 46 600 kg/h, thus giving τ=12 s. The measured dopant concentrations are reported in table 6.

TABLE

|  | Before contacting of the mixture with the adsorber material | After contacting of the mixture with the adsorber material |
|---|---|---|
| Boron [ppta] | 817.0 | 555.0 |
| Phosphorus [ppta] | 145.0 | 124.0 |
| Arsenic [ppta] | 19.0 | 18.0 |

Example 3

At 20° C. and 1 bar (g) in a glass flask 0.54 g of an acrylonitrile-divinylbenzene copolymer (adsorber material) functionalized with an amidoxime of formula (I) ($R^1$=H, $R^2$=H) were admixed with 20 g of a chlorosilane mixture (about 96% by weight of TCS and 4% by weight of DCS) over several hours. The adsorber material was subsequently removed with a filter. The absorber material was in particulate form and had an average diameter of 0.4 to 1.4 mm. The proportion of water was <2% by weight. The average pore diameter of the functionalized particles was $400*10^{-10}$ m. The boron concentration was determined by ICP-OES before and after the contacting (cf. table 7).

TABLE 7

|  | Before contacting of the mixture with the adsorber material | After contacting of the mixture with the adsorber material |
|---|---|---|
| Boron [ppmw] | 32,150 | 0.453 |

Example 4

In a glass flask at 5° C. and 1 bar (g) 0.40 g of the absorber material from example 3 were admixed with 15 g of a chlorosilane mixture (about 99% by weight of TCS and 1% by weight of DCS) over several hours. The boron concentration was determined as in example 3 (cf. table 8).

TABLE 8

|  | Before contacting of the mixture with the adsorber material | After contacting of the mixture with the adsorber material |
|---|---|---|
| Boron [ppbw] | 4000 | 53 |

Comparative Example 5

In a glass flask at 20° C. and 1 bar (g) 0.40 g of particulate (diameter of 1.5 to 4.4 mm), activated silica gel (Xi'an Lvneng Purification Technology) were admixed with 15 g of TCS. The boron concentration was determined as in examples 3 and 4 (cf. table 9).

TABLE 9

|  | Before contacting of the TCS with the silica gel | After contacting of the TCS with the silica gel |
|---|---|---|
| Boron [ppbw] | 4000 | 1600 |

The invention claimed is:

1. A process for at least partially removing an impurity from a liquid mixture comprising at least one chlorosilane and/or organochlorosilane and at least one impurity which is a boron compound, a phosphorus compound, an arsenic compound, or an antimony compound, comprising the steps of:
a) contacting the liquid mixture with a carrier material functionalized with an amidoxime of structural formula (I),

where
CAR=carrier material and $R^1$, $R^2$ are independently of one another H, alkyl, alkenyl, aryl, alkylaryl; and
b) optionally removing the functionalized carrier material.

2. The process of claim 1, wherein $R^1$, $R^2$ are independently of one another H or Me.

3. The process of claim 1, wherein the chlorosilane is an acyclic chlorosilane of the formula $H_xSi_nCl_{(2n+2-x)}$ where $0 \le x \ge 12$ and $1 \le n \ge 5$ and/or a cyclic chlorosilane of general formula $H_xSi_nCl_{(2n-x)}$ where $0 \le x \ge 20$ and $4 \le n \ge 10$.

4. The process of claim 2, wherein the chlorosilane is an acyclic chlorosilane of the formula $H_xSi_nCl_{(2n+2-x)}$ where $0 \le x \ge 12$ and $1 \le n \ge 5$ and/or a cyclic chlorosilane of general formula $H_xSi_nCl_{(2n-x)}$ where $0 \le x \ge 20$ and $4 \le n \ge 10$.

5. The process of claim 1, wherein at least one chlorosilane is selected from the group consisting of tetrachlorosilane, trichlorosilane, dichlorosilane, and combinations thereof.

6. The process of claim 1, wherein the organochlorosilane is an acyclic organochlorosilane of formula $H_xSi_nR^3_yCl_{(2n+2-x-y)}$ where $0 \le x \ge 11$, $1 \le n \ge 5$ and $1 \le y \ge 12$ and/or a cyclic organochlorosilane of general formula $H_xSi_nR^3_yCl_{(2n-x-y)}$ where $0 \le x > 19$, $4 \le n \ge 10$ and $1 \le y \ge 20$, wherein $R^3$=alkyl, aryl, alkylaryl or alkoxy.

7. The process of claim 1, wherein the functionalized carrier material contains a proportion of water of less than 5% by weight.

8. The process of claim 1, wherein the functionalized carrier material contains a proportion of water of less than 3% by weight.

9. The process of claim 1, wherein the functionalized carrier material contains a proportion of water of less than 2% by weight.

10. The process of claim 1, wherein the carrier material is selected from the group consisting of polyacrylonitrile, polyacrylic acid, polyacrylic acid ester, silica, polymethacrylic acid, polymethacrylic acid ester, styrene-divinylbenzene copolymer, and combinations and copolymers thereof.

11. The process of claim 1, wherein the carrier material is in particulate form and has a surface area of 10 to 2000 m²/g.

12. The process of claim 1, wherein the carrier material is in particulate form and has a surface area of 50 to 500 m²/g.

13. The process of claim 1, wherein the carrier material has an average pore diameter of 40 to $900*10^{-10}$ m.

14. The process of claim 1, wherein the carrier material has an average pore diameter of 75 to $700*10^{-10}$ m.

15. The process of claim 1, wherein in step a) the functionalized carrier material is in the form of a fixed bed in a single container or in two or more containers arranged in series or in parallel.

16. The process of claim 15, wherein the liquid mixture traverses the fixed bed continuously.

17. The process of claim 15, wherein a hydrodynamic residence time of the mixture in the reaction volume is 0.5 to 1800 s.

18. The process of claim 1, wherein the functionalized carrier material is a particulate solid, and is removed from the liquid mixture in step b) by a solid-liquid separation.

19. The process of claim 1, wherein the concentration of the impurity in the mixture is determined before step a) and/or after step a).

20. The process of claim 1, wherein at least one impurity is a compound of hydrogen, halogen, carbon and/or silicon, with boron, phosphorus, arsenic, and/or antimony.

* * * * *